United States Patent [19]

Geier et al.

[11] Patent Number: 5,416,712
[45] Date of Patent: May 16, 1995

[54] POSITION AND VELOCITY ESTIMATION SYSTEM FOR ADAPTIVE WEIGHTING OF GPS AND DEAD-RECKONING INFORMATION

[75] Inventors: George J. Geier, Santa Clara; Ardalan Heshmati, Campbell; Kelly G. Johnson, Milpitas; Patricia W. McLain, Sunnyvale, all of Calif.

[73] Assignee: Trimble Navigation Limited, Sunnyvale, Calif.

[21] Appl. No.: 68,983

[22] Filed: May 28, 1993

[51] Int. Cl.⁶ .......................... G01S 5/02; G06F 15/50
[52] U.S. Cl. ..................................... 364/450; 364/449; 342/357; 342/457; 73/178 R
[58] Field of Search ........... 364/450, 459, 449, 424.02; 340/988, 991, 992, 870.06; 342/357, 358, 352, 356, 457; 73/178 R

[56] References Cited

U.S. PATENT DOCUMENTS

| | | | |
|---|---|---|---|
| 4,646,096 | 2/1987 | Brown | 342/357 |
| 4,727,492 | 2/1988 | Reeve et al. | 364/424.02 |
| 4,731,613 | 3/1988 | Endo et al. | 342/357 |
| 4,903,212 | 2/1990 | Yokouchi et al. | 364/449 |
| 4,949,268 | 8/1990 | Nibhikawa et al. | 364/449 |
| 5,075,693 | 12/1991 | McMillan et al. | 342/457 |
| 5,119,301 | 6/1992 | Shimizu et al. | 364/450 |
| 5,202,829 | 4/1993 | Geier | 304/449 |
| 5,272,483 | 12/1993 | Kato | 342/357 |
| 5,278,424 | 1/1994 | Kagawa | 364/450 |
| 5,293,318 | 3/1994 | Fukushima | 364/449 |

*Primary Examiner*—Kevin J. Teska
*Assistant Examiner*—Tan Nguyen
*Attorney, Agent, or Firm*—Thomas E. Schatzel

[57] ABSTRACT

An embodiment of the present invention is a combined GPS and dead-reckoning (DR) navigation sensor for a vehicle in which a pair of modifications are made to an otherwise conventional Kalman filter. Process noise is adapted to cope with scale factor errors associated with odometer and turning rate sensors, and correlated measurement error processing is added. When only two Doppler measurements (PRRs), or three with an awkward three-satellite geometry, are available, DR error growth can nevertheless be controlled. The measurement error correlations in the conventional Kalman filter covariance propagation and update equations are explicitly accounted for. Errors induced by selective availability periods are minimized by these two modifications.

14 Claims, 5 Drawing Sheets

POSITION AND VELOCITY ESTIMATION SYSTEM FOR ADAPTIVE WEIGHTING OF GPS AND DEAD-RECKONING INFORMATION

BACKGROUND OF THE INVENTION

1. Field of the Invention

The invention relates generally to navigation systems and more specifically to global positioning system (GPS) devices that use dead-reckoning apparatus to fill in as backup during periods of GPS shadowing such as occur amongst obstacles, e.g., tall buildings in large cities.

Global positioning system receivers typically use signals received from three or more overhead satellites to determine navigational data such as position and velocity, and such systems may also provide altitude and time. GPS signals are available worldwide at no cost and can be used to determine the location of a vehicle, such as a car or truck, to within one city block, or better. Dual-frequency carrier GPS receivers typically track a pair of radio carriers, L1 and L2, associated with the GPS satellites to generate pseudo range measurements (PR) from precision code (P-code) or coarse acquisition code (C/A-code) modulation on those carriers. Carrier L1 is allocated to 1575.42 MHz and carrier L2 is positioned at 1227.78 MHz. Less expensive receivers tune to only one carrier frequency, and therefore cannot directly observe the local ionospheric delays that contribute to position error. At such frequencies, radio carrier signals travel by line-of-sight, thus buildings, mountains and the horizon can block reception.

The constellation of GPS satellites in orbit about the earth comprises individual satellites that each transmit a unique identifying code in a code multiple access arrangement. This allows the many GPS satellites to all transmit in spread spectrum mode at the same frequency (plus or minus a Doppler shift from that frequency as results from the satellite's relative velocity). Particular satellites are sorted out of a resulting jumble of signals and noise by correlating a 1023 "chip" code to a set of predefined codes that are preassigned to individual GPS satellites. These codes do not arrive in phase with one another at the receiver. Therefore, "finding" a GPS satellite initially involves searching various carrier frequencies, to account for Doppler shift and oscillator inaccuracies, and searching for a code match, using 1023 different code phases and up to twenty-four possible correlation code templates.

In large cities with many tall buildings, one or more of the GPS satellites that a particular receiver may be tracking may be temporarily blocked. In some situations, such blockage can prevent all the overhead GPS satellites from being tracked and such outages can last for several minutes. GPS signals also become unavailable to vehicles when moving through underground or underwater tunnels. Therefore a method and apparatus are needed to bridge an information gap that exists between periods of GPS signal availability. Dead-reckoning techniques have been used in the background art to supply navigation data, both alone and in concert with GPS systems.

The prior art has not recognized nor taken full advantage of the fact that while within the typical "urban canyon," at least two GPS satellites are typically visible at any one instant. A significant performance advantage is possible if such GPS satellites are productively used to blend partial GPS information with dead-reckoning information. Such blending reduces the drift that is inherent in dead-reckoning. More accurate information is thus available on average, and overall accuracy can be maintained for relatively longer periods of GPS signal shadowing.

A navigation system for a vehicle using a dead-reckoning system can encounter several sources of error. Initial position errors can result from GPS inaccuracies, especially in selective availability (SA) and multipath signal environments. A heading error may result from a difference between a vehicle's change in direction and the sensed change in direction, for example, as derived from a single-degree of freedom inertial gyro. Such errors can range from one to five percent for low-cost gyros. Heading errors can also stem from gyro rate bias/drift, scale factor non-linearity and initial warm-up problems. An odometer error is created by differences between the distance a vehicle actually travels and the vehicle's odometer indicated distance. Such errors can be classified as scale factor and scale factor non-linearity. Sensor measurement noise will also corrupt data obtained. Terrain sloping can cause a third type of error in that the ground traveled by a vehicle may exceed the horizontal distance traversed due to a change in altitude.

SUMMARY OF THE PRESENT INVENTION

It is therefore an object of the present invention to provide a system and method for using both partial and full GPS information in a blend of adaptively-weighted GPS and dead-reckoning determinations to provide vehicle position and velocity information to remote users.

An object of the present invention is to provide a system and method for blending position and velocity solutions that allow for a filtering of errors between DR and GPS determinations in an intelligent way that recognizes the characteristics of the respective error sources.

Briefly, a preferred embodiment of the present invention is a vehicle position and velocity estimation system that blends GPS solutions and dead-reckoning using a modified set of decoupled (decentralized) Kalman filters. Process noise is adapted to cope with scale factor errors associated with the odometer and turning rate sensor, and correlated measurement error modeling is added to a conventional Kalman filter. When only two Doppler measurements (PRRs), or three with an awkward three-satellite geometry, are available, an accumulated dead reckoning error can nevertheless be controlled. The correlated measurement error are explicitly accounted for in the modified Kalman filter covariance propagation and update computations.

An advantage of the present invention is that it provides a system for continuous calibration of dead-reckoning sensor input data to provide accurate position solutions.

Another advantage of the present invention is that a system is provided that automatically switches to a calibrated dead-reckoning solution when GPS satellite signals are blocked for any reason.

Another advantage of the present invention is that a system is provided that can cause position, time and/or velocity to be automatically reported when an alarm sensor is activated.

An advantage of the present invention is that a system is provided that can derive information from available GPS satellite signals when the number of GPS satellites visible is less than three.

Another advantage of the present invention is that a system is provided that can be mounted within a vehicle and used to report a velocity and/or position of the vehicle even though GPS satellites may not always be visible at the vehicle's position.

A further advantage of the present invention is that a system is provided in which the blending filters adapt to detected anomalies in both the GPS and DR sensor data, thereby improving a vehicle position and velocity estimation system response to anomalous performance of its sensors.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
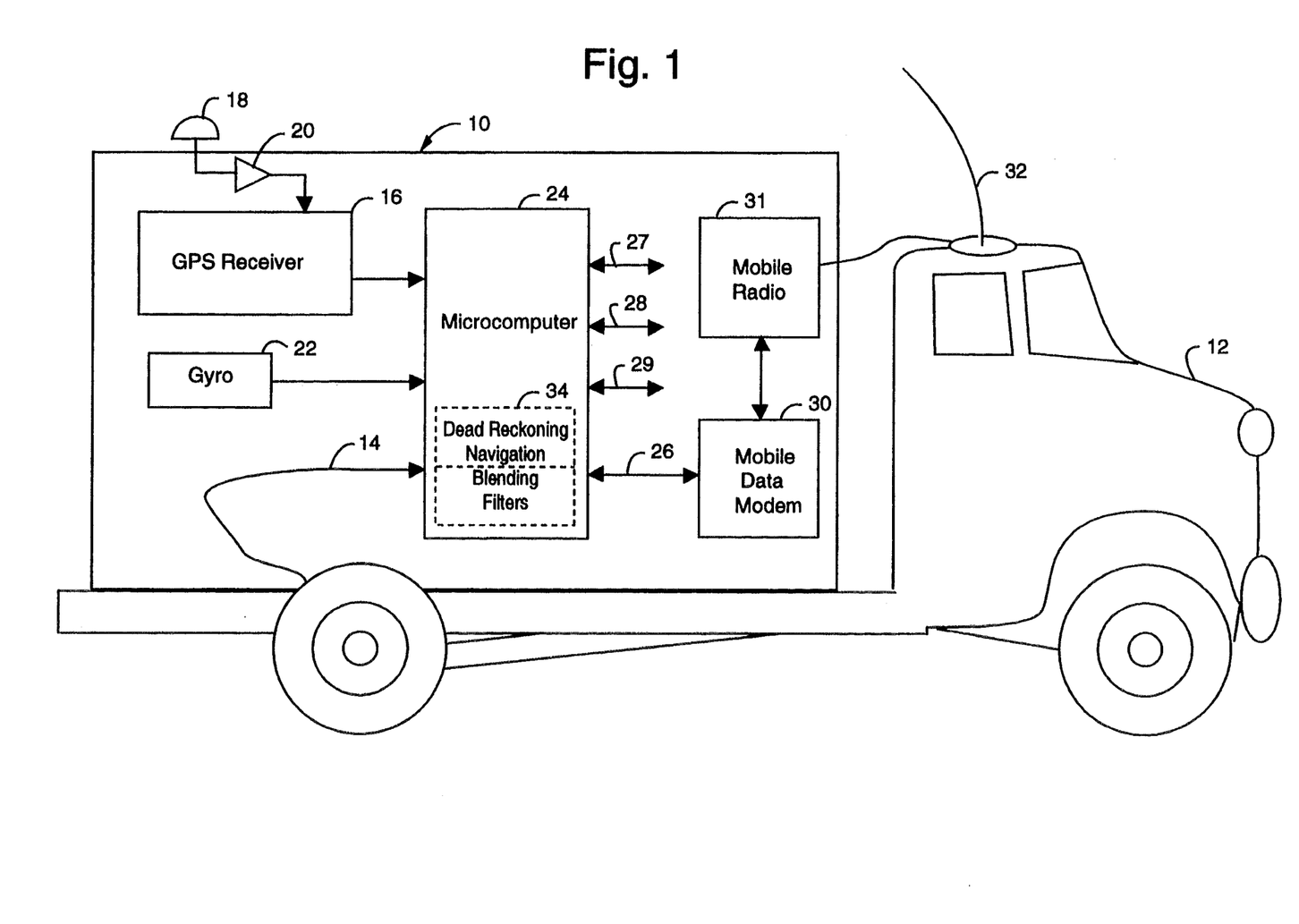
FIG. 1 is a block diagram of a vehicle position and velocity estimation system embodiment of the present invention which rides on-board a land vehicle and reports vehicle position and velocity via a mobile radio.

FIG. 1 illustrates a global positioning system (GPS) mobile system embodiment of the present invention, referred to herein by the general reference numeral 10. System 10 has a six-channel vehicle tracking capability that uses GPS satellite signals to provide position and velocity information related to a vehicle 12 onboard which system 10 is mounted. System 10 comprises an odometer signal connection 14, a multi-channel GPS receiver 16, a GPS antenna 18 and a low-noise preamplifier 20. A signal from a turning rate sensor gyro 22 is input to a microcomputer system 24 for dead reckoning heading information input. Gyro 22 is preferably a low-cost type, such as those based on piezoelectric solid state elements. Antenna 18 is preferably a hard mount patch antenna for permanent mounting. For example, good results have been obtained with antennas having dimensions of approximately 3.75 inches by four inches by 0.75 inches, and by using a flange mount patch antenna for temporary mounting with dimensions in the order of 4.75 inches by four inches by 1.75 inches. Antenna 18 is best placed on top of vehicle 12 where a view of GPS satellites will be the least obstructed by vehicle 12.

A conventional Kalman filter when used to integrate GPS and dead reckoning information would attempt to represent the effects of selective availability (SA) which is the dominant GPS error source as white noise, or augment its state vector to include states which represent SA. Neither of these approaches would be appropriate in the present application: the effects of SA are highly correlated over minutes, so frequent GPS updating (e.g., once per second) would result in optimism in the Kalman filter covariance and resultant measurement under-weighting and perhaps rejection (simulation results will be presented later to illustrate this point). On the other hand, direct inclusion of SA error states leads to an unnecessary computational burden, and would jeopardize the ability to implement the design on a low-cost microprocessor (e.g., a 10 MHz Motorola 68000 without math coprocessor). In addition, there are model fidelity issues relating to the inclusion of SA error states, i.e., how well SA can be modeled. Use of the approach described herein avoids these problems by representing the effects of SA in the Kalman update equations, without attempting to estimate SA directly. An efficient and robust design results, described in detail later in this application.

GPS receiver 16 is such that it computes a complete vehicle position/velocity solution from signals received from at least three GPS satellites and it computes pseudo ranges (PRs) and pseudo range rates (PRRs) from signals received from GPS satellites tracked by the receiver. The GPS solutions or PRs and PRRs are used with data obtained from gyro 22 and odometer signal 14 in a set of blending filters included as program software within the microcomputer system 24. A set of serial interfaces 26-29 may be provided by microcomputer system 24. Specifically, interface 26 may be a serial port suited for use with the Trimble Navigation (Sunnyvale, Calif.) ASCII interface protocol (TAIP). A modem 30 allows a radio 31 to transmit speed and location information regarding vehicle 12 through an antenna 32. Such information would, for example, be useful to a central dispatcher of delivery trucks or of public safety vehicles, such as police and fire units.

Microcomputer system 24 includes the basic dead reckoning equations, gyro and odometer interface conditioning and calibration, and filters 34, in computer firmware program form, for estimating a heading and velocity of vehicle 12, and for estimating how much error exists in the dead-reckoned position and in the position solutions derived from GPS receiver 16. A best estimate and estimation error variance are obtained. Errors associated with dead reckoning inputs are systematic in nature and therefore include components that can be estimated to yield more precise results. Therefore, while Kalman filter 34 is in large part conventional, it comprises modifications to prevent it from excluding heretofore unrecognized systematic errors as being simply white noise. For example, the heading variances produced are constrained to be relatively more conservative.

Figure 2:
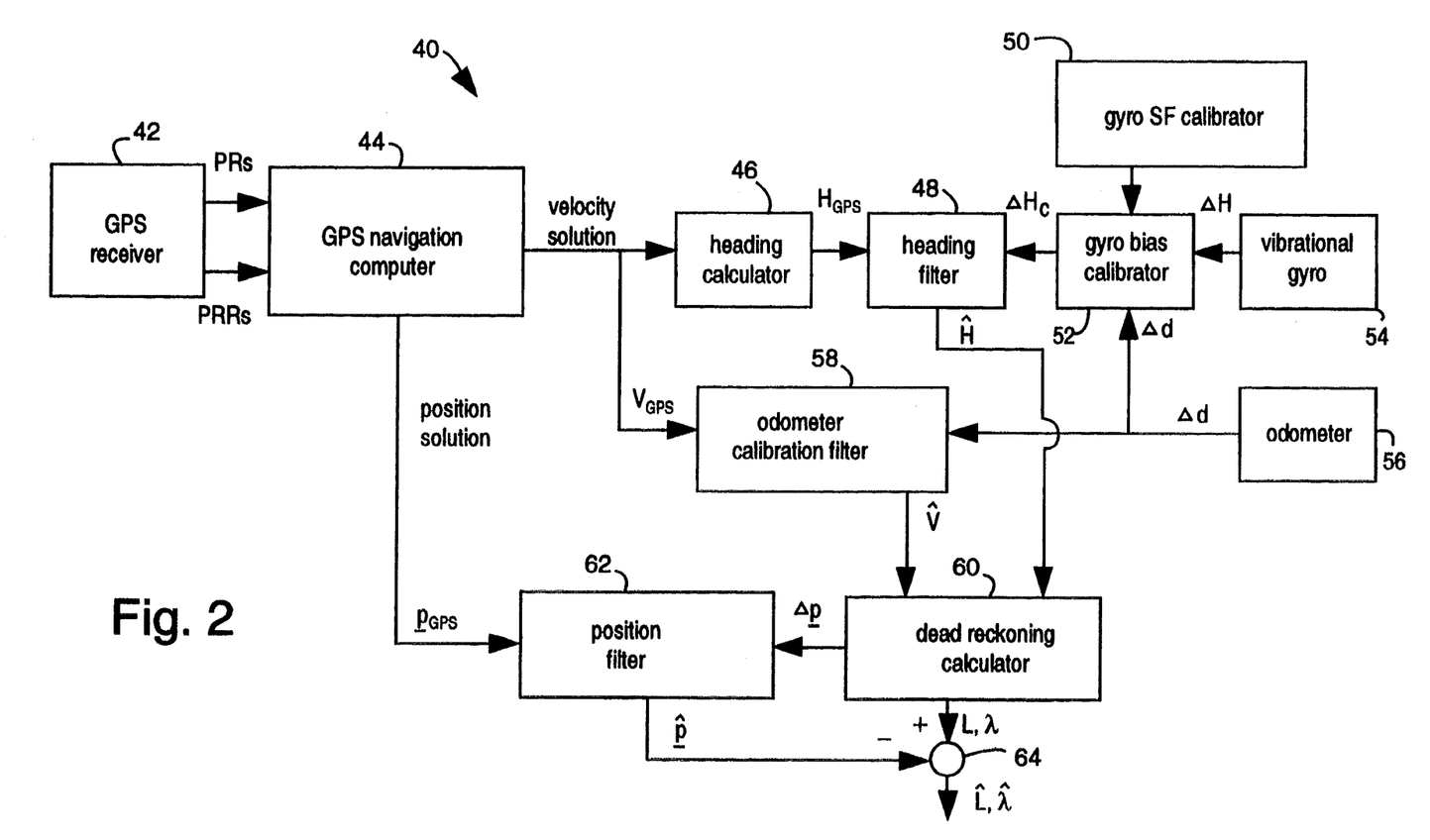
FIG. 2 is a block diagram of a blending filter process included in the microcomputer of the system of FIG. 1 which combines a heading filter, a position filter and a speed filter to produce position and velocity solutions for transmission by the mobile radio of FIG. 1.

FIG. 2 illustrates a GPS/DR navigation system 40 with a decentralized filter approach. A GPS receiver 42 provides pseudo ranges (PRs) and pseudo range rates (PRRs) to a GPS navigation computer 44, such as microcomputer 24 (FIG. 1). A GPS velocity solution ($V_{GPS}$) is fed to a heading calculator 46 that produces a GPS heading solution ($H_{GPS}$). A heading filter 48 accepts inputs $H_{GPS}$ and a signal $\Delta H_C$ from the gyro 22 following the operation of a gyro scale factor calibrator 50 and a gyro bias calibrator 52. A vibrational gyro 54 provides a heading change signal ($\Delta H$). An odometer 56 provides a distance change signal ($\Delta d$) to both the gyro bias calibrator 52 and an odometer calibration filter 58.

A velocity estimate ($\hat{V}$) and a heading estimate ($\hat{H}$) are received by a dead reckoning (DR) calculator 60. A position filter 62 receives both a DR change of position signal ($\Delta p$) and a GPS position solution ($p_{GPS}$). A blended signal ($\hat{L}, \hat{\lambda}$) is obtained by correcting the dead reckoning position and is output from a blender 64.

FIG. 2 shows the interaction between the GPS receiver computed positions and velocities, the gyro and odometer data, and the three blending filters. The decentralized nature of the blending filters is in contrast with a more conventional, Kalman filter approach which collects all variables of interest in a single (larger) state vector. A conventional Kalman filter implementation is impractical in a low cost microprocessor, and therefore not preferred. Such a filter, however, may be partitioned into the three smaller filters: a heading filter, speed filter and a position filter. A significant reduction in computational requirements is possible, with no significant adverse impact on performance.

Speed and heading information is derived from the GPS velocity computed by the GPS navigation computer 44. This information is input to the odometer calibration and heading filters 58 and 48. Each of these filters is a single state, Kalman-like filter, modified to account for SA-induced error, which is the dominant correlated measurement error contributor. The odometer scale factor calibration filter 58 examines the difference between odometer-derived velocity and GPS-derived velocity, and corrects the odometer scale factor, thereby improving the estimate of distance traveled input to the dead reckoning calculations. The gyro scale factor error is preferably calibrated at installation and periodically at startup, and may also be calibrated using GPS. The gyro bias is continuously updated using a separate filter, based upon the knowledge that the vehicle 12 is stationary, as determined from the odometer 56. The gyro bias calibrator (filter) 52 preferably includes a bias monitor, which examines the stability of the calculated bias, and makes adjustments to the parameters of the heading filter based upon the predicted stability. The gyro sensed heading rate, compensated for its bias, along with a measure of the bias stability, is input to the heading filter 48, where it is blended with GPS-derived heading to improve the heading which is passed to the dead reckoning equations. The outputs of the dead reckoning calculations (e.g., the predicted latitude and longitude of the vehicle 12), are input to the position filter, which generates corrections to them based upon the GPS-derived positions. The position filter is also implemented as a Kalman filter modified to handle correlated errors which are dominated by SA. The corrected latitude and longitude, appropriately time-tagged, is then passed to the modem/radio combination for communication to the outside world.

Microcomputer system 24 prevents position and velocity solutions that are abruptly deviant from previous solutions from being fully weighed into final position and velocity solutions. In the prior art, it is not uncommon for GPS-derived solutions to "jump" from one reading to the next. GPS position solutions can change abruptly, e.g., due to constellation changes, which are especially significant when operating non-differentially.

In particular, GPS position solutions can appear to be discontinuous ("jump") whenever reflected signals and-/or radio frequency interference is present. Such conditions are common in the so-called "urban canyon" environment. It is however, characteristic of DR solutions to not Jump. Therefore, Kalman filter 34 includes modifications to a conventional Kalman filter that exclude or de-emphasize (de-weight) GPS solutions that have jumped by magnitudes that the DR solutions tend to indicate as being impossible or improbable.

However, an override mechanism is needed to allow an ever increasing body of GPS-derived solutions to overcome what first appeared to be an impossible departure from the DR solutions. Such a situation could occur if vehicle 12 was transported a substantial distance by ferry, in which case the indicated travel distance at odometer input signal 14 would be near zero.

In general, Kalman filters cannot be applied without recognizing the effects of correlated error, dominated by SA, which is applied by the Department of Defense. The effects of SA cannot be filtered out over time, because the effects of SA are intentionally not equivalent to white noise. Therefore, Kalman filter 34 accommodates SA by making a special modification to a conventional Kalman filter algorithm. An implicit modeling of SA is included in Kalman filter 34 such that when the Kalman filter 34 does an update the decay is forced to assume a rate that has been empirically determined to be consistent with previous observations of SA, instead of allowing a decay as $1/\sqrt{n}$, where "n" is the number of uncorrelated measurements of a stationary observable. For example, SA will vary in its effect very little from second to second, but over a period of a minute to a hundred seconds, SA can decorrelate. For a standard deviation of thirty meters and ten measurements during stationary operation, for example, conventional Kalman filters will predict an error standard deviation of roughly ten meters. This error variance will be grossly optimistic if the ten measurements are processed over a time interval which is short, relative to the expected SA period. If the measurements were generated over a period of ten seconds, for example, the error variance of the conventional Kalman filter would be optimistic by roughly a factor of ten. This could lead to de-weighting or rejection of subsequent GPS measurements and divergence of the resulting position solution.

Figure 3:
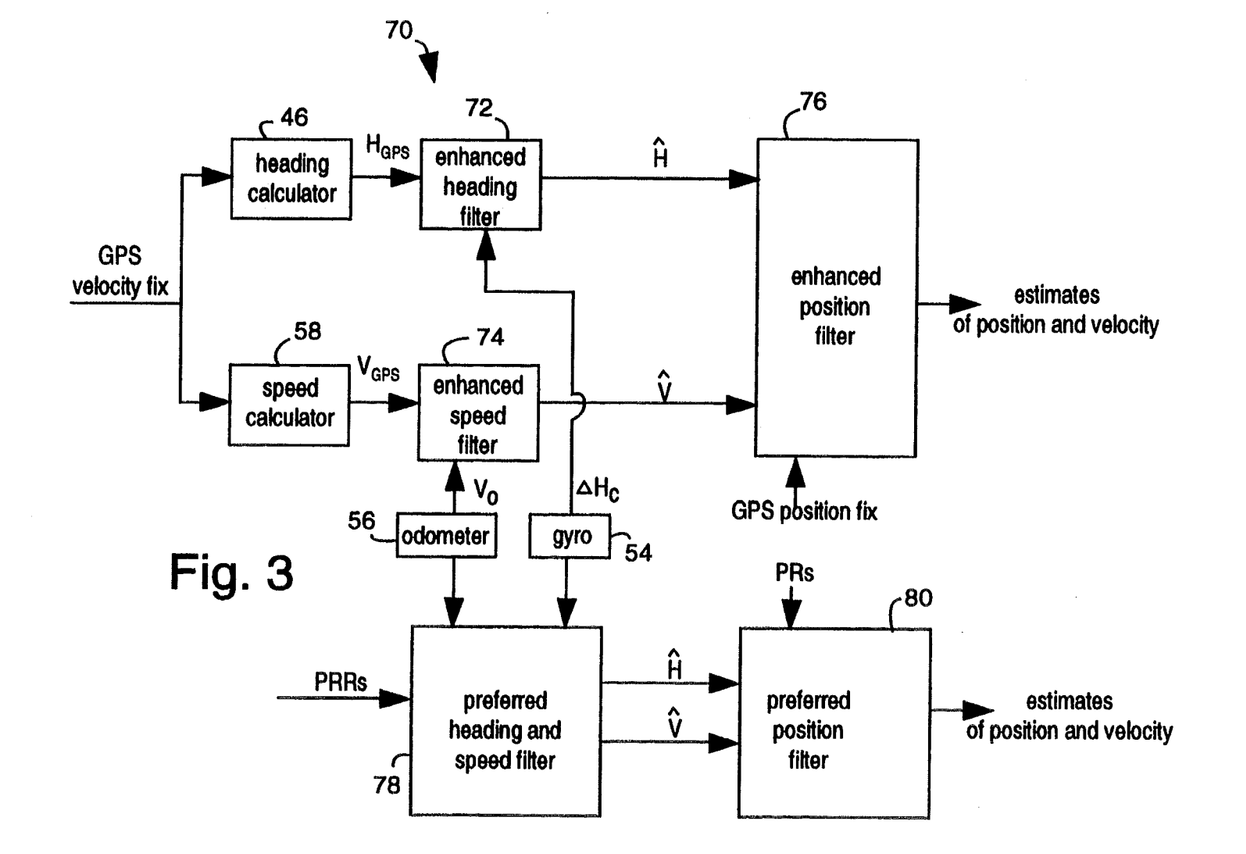
FIG. 3 is a block diagram of a modified Kalman filter as used in the system of FIG. 2.

FIG. 3 illustrates a Kalman filter 70 partitioned into a set of coupled filter units, including an enhanced heading filter 72, a velocity (speed) filter 74 and a position filter 76. In an alternative embodiment of the present invention, the enhanced heading and speed filters 72 and 74 may be substituted with a preferred heading and speed filter 78, and a preferred position filter 80. Heading filter 78 is preferred in instances where the interface with GPS receivers 16 or 42 (FIGS. 1 or 2) permits access to individual GPS measurements, e.g., when only two PRRs are available because a third GPS satellite is unavailable or its signal is being blocked for some reason. Heading sand speed filters 72 and 74 are used when the interface, e.g., with GPS receiver 16, is limited to access of only GPS-based velocity, as might be the case for commercially available GPS receivers. Similarly, the enhanced position filter 76 is limited to use of GPS-derived positions, whereas the preferred position filter can make use of individual pseudo range measurements. Nevertheless, filters 72, 74 and 76 combine to provide modeling of the adverse effects of correlated error, e.g., SA, and scale factor errors, e.g., from gyro 22 and odometer input signal 14. A level of adaptability to gyro and/or odometer failures is desirable and included in Kalman filter 70.

The enhanced heading filter 72 is preferably a computer-implemented process for execution by microcomputer 24, and is described mathematically by equation (1), as follows:

given: GPS-derived heading from a velocity solution include minimum velocity qualification testing estimate accuracy of GPS-derived heading:

$$\sigma^2_{H/GPS} = \begin{cases} HDOP^2\left[\left(\sigma^2_{asa}\frac{\Delta t_c^2}{v^2}\right)+\left(\frac{\sigma_v^2}{v^2}\right)\right] \text{(differential)} \\ HDOP^2\left[\left(\frac{\sigma^2_{vsa}}{v^2}\right)+\left(\frac{\sigma_v^2}{v^2}\right)\right] \text{(nondifferential)} \end{cases} \quad (1)$$

where:
HDOP=horizontal dilution of precision value output with a current fix,
$\sigma_{asa}$=one-sigma SA acceleration magnitude,
$\sigma_{vsa}$=one-sigma SA velocity error,
v=current speed from GPS receiver 16,
and
$\Delta t_c$=age of differential correction in seconds.

Typical values for $\sigma_{asa}$ are 0.005–0.01 meters per second squared, while typical values for $\sigma_{vsa}$ include 0.25–0.50 meters per second. A constant value for $\Delta t_c$ may be assumed, since this information may not be readily available in real-time for the enhanced filters. Equation (1) specifies the error variance of the GPS-derived heading, which is assumed to include a temporally correlated component, dominated by SA, and a white-noise component $\sigma_v$. Equation (1) applies to a three-dimensional velocity fix, e.g., from GPS receiver 16. A more conservative calculation is necessary if using a two-dimensional velocity fix. Modeling such a correlated error component prevents the Kalman filter 70 from becoming unrealistically optimistic. The heading error correlation is represented by $\sigma_c$, wherein:

initialization: $\sigma_c=0$ propagation: $\sigma_{ck+1}^- = \Phi_{sa}\sigma_{ck}^+$ (2)

update: $\sigma_{ck+1}^+ = (1-k)\sigma_{ck+1}^- + k\,\sigma_{H/GPS/C}^2$ (3)

where:
k=pseudo-Kalman measurement gain
$\sigma^2_{H/GPS/C}$=first term in equation (1) excluding $\sigma_v$.

$$\phi_{sa} = \begin{cases} 1 - \frac{\Delta t}{\tau_{sa}} & \Delta t < \tau_{sa} \\ 0 & \Delta t \geq \tau_{sa} \end{cases}$$

Equation (2) is used to propagate the heading error correlation in time (e.g., in between GPS updates), while equation (3) indicates how the correlation changes across a measurement update.

Typical values for $\tau_{sa}$ are 60–200 seconds. A decay of the SA correlation is assumed to be linear in the propagation interval. This represents an approximation to the exponential decorrelation which is valid for time periods that are short, relative to the decorrelation time associated with SA. This represents a very good approximation most of the time, and saves the computation of the exponential term. When the approximation breaks down, e.g., when the time interval approaches the decorrelation time, the correlation is simply set to zero. If the constellation on which the velocity solution is based changes significantly, it may be worthwhile to also set $\Phi_{sa}=0$.

For heading update:

$$\hat{H}_{k+1}^- = \hat{H}_k^+ + \Delta H_{gyro}, \quad (4)$$

where:
$\Delta H_{gyro}$ has been compensated for bias, $$H_{res} = \hat{H}_{GPSk+1} - \hat{H}_{k+1}^-$$

where:

$\hat{H}_{GPS}$=GPS-derived heading.

For a statistical reasonableness test on $H_{res}$:

compute $\sigma_{res}^2 = \sigma_{Hk+1}^2 - 2\sigma_{ck+1} + \sigma_{H/GPS}^2$. (b 5)

Two parameters control the test ($C_1$, $C_2$), if $H_{res}^2 \geq C_1 \sigma_{res}^2$ and $H_{res}^2 < C_2 \sigma_{res}^2$, (6)

reduce pseudo Kalman gain: $k < -k/C_2$ if $H_{res}^2 \geq C_2 \sigma_{res}^2$ bypass measurement update.

Tentatively, $C_1=9$, $C_2=25$ (alternatively, $C_2=C_1$). The residual tests involving the parameters $C_1$ and $C_2$ are intended to reduce the solution sensitivity to unmodelled errors associated with the GPS-derived heading. Two such error mechanisms are the generation of a solution based upon either reflected signals and/or signals "spoofed" by RF interference.

$$k = (\sigma_{Hk+1}^2 - \sigma_c)/\sigma_{res}^2, \quad (7)$$

$$\hat{H}_{k+1}^+ = \hat{H}_{k+1}^- + k\,H_{res}. \quad (8)$$

Figure 4:
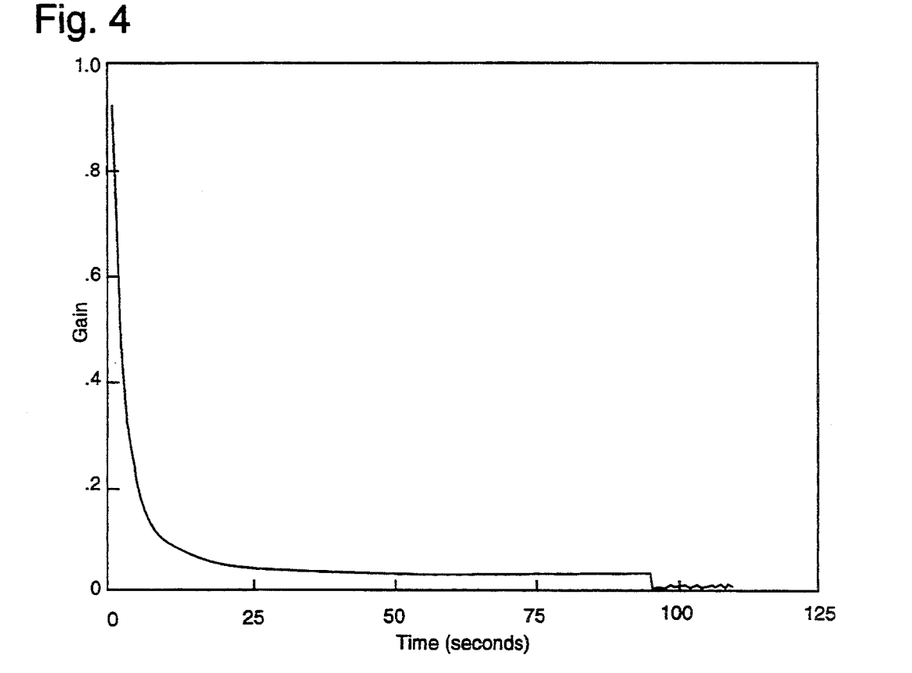
FIG. 4 plots the gain history for a conventional filter.

There is a difference in form for the "Kalman gain" k appearing in equation (7) compared to the conventional gain calculation: the correlation term is subtracted from the a priori error variance, and also used to adjust the residual variance (equation 4). The effect of the correlation term, representing the effects of SA, is to increase the gain floor of the filter, and keep the filter "aware" of the effects of the correlation, e.g., to prevent it from "falling asleep". These effects are illustrated in FIGS. 3 and 4, which compare the results of the modified filter with a conventional Kalman filter. The plots are derived from a Monte Carlo simulation of both filter designs run on a IBM-compatible 386/25 MHz personal computer, with realistic models for the gyro, odometer and GPS. They correspond to a vehicle initially traveling in a straight line at forty miles per hour (MPH) for roughly one hundred seconds, and then slowing to twenty MPH. GPS velocity updates are assumed to be available each second, and differential corrections are not available to the vehicle. Thus the impact of SA on navigation error is maximum.

Figure 5:
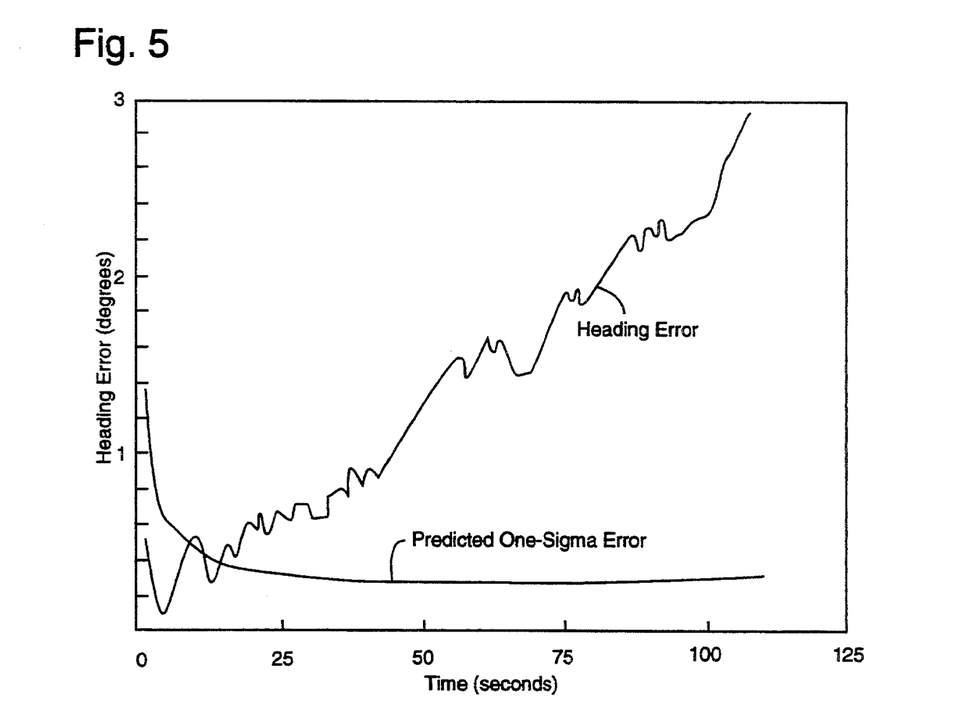
FIG. 5 plots the error and covariance histories of the filter of FIG. 4.

FIG. 4 plots the gain history for a conventional filter, followed by its error and covariance histories in FIG. 5.

Figure 6:
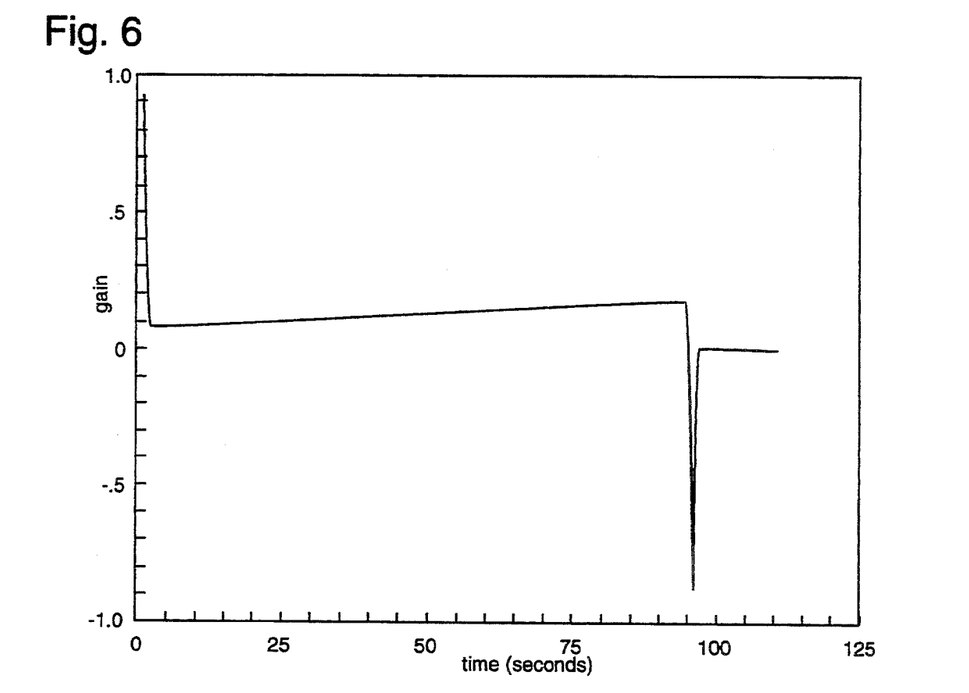
FIGS. 6 and 7 represent the corresponding plots for the modified filter design of FIG. 3.
Figure 7:
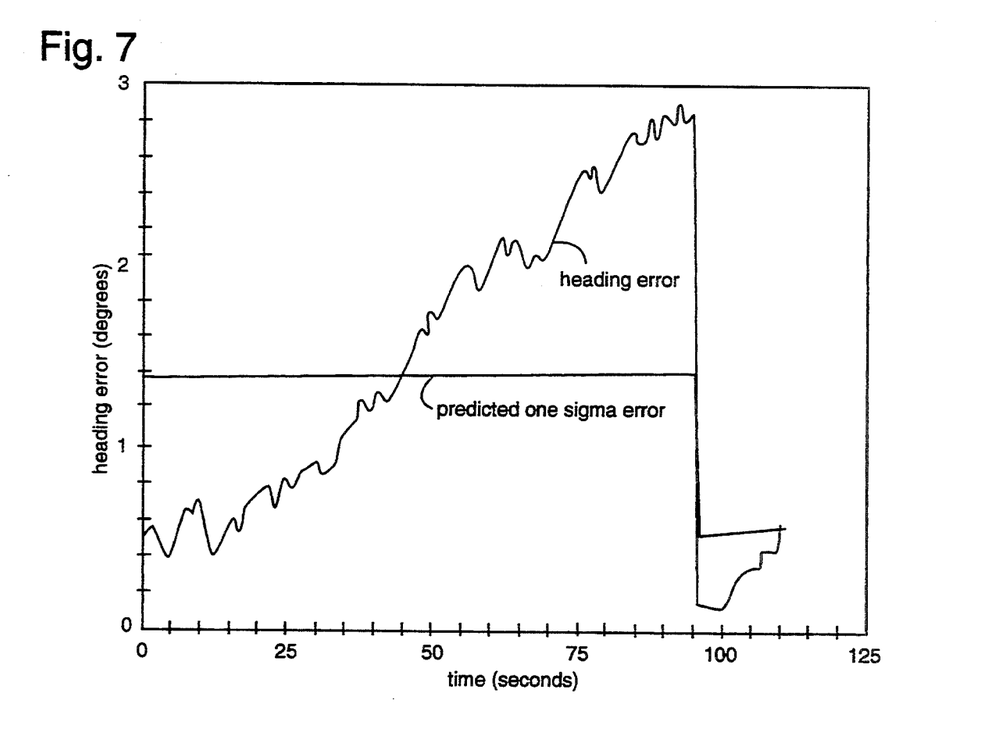

FIGS. 6 and 7 represent the corresponding plots for the modified filter design of FIG. 3. The differences in gain and covariance behavior are such that the conventional filter is more optimistic and uses gains which are too low. These would typically begin rejecting measurements if such testing was included in the simulation, making the improvements even more dramatic. In fact, as evidenced by FIG. 5, the conventional filter assumes it has averaged out SA error, and predicts a one-sigma error of roughly one-half degree, when more than three degrees of error are actually present. In contrast, a significant improvement is realized with the modified Kalman filter. During the first one hundred seconds of the simulation, its expectation of roughly 1.5 degrees one sigma, are more consistent with the SA error. Following the speed change, the heading error is substantially reduced to roughly 0.2 degrees. Such a reduction is possible by the removal of the SA contribution, and there is a negative gain at the transition. Thus in the simulated run, more than a factor of ten improvement is realized with the modified filter.

For covariance propagation, $\sigma_c$ propagation is described by equation (2).

In modeling the effects of gyro scale factor error, it is assumed that residual errors for clockwise (CW) and counterclockwise (CCW) rotations of vehicle 12 are statistically uncorrelated. There are, therefore, separate specifications, $\sigma_{SF+}^2$ and $\sigma_{SF-}^2$. These specifications may be adapted as a function of the changes in the calculated scale factor factors, if they are periodically or dynamically computed. However, $\sigma_{SF+}^2$ and $\sigma_{SF-}^2$, are assigned the same initial values.

Two separate sums, $\Delta H_{gryo+sum}$ and $\Delta H_{gryo-sum}$ are computed and correspond to the different signs of the heading changes, as illustrated by the following pseudocode:

If, $|\Delta H_{gryo}| > \Delta H_{threshold}$ (9)

If, $\Delta H_{gryo} > 0$ $\Delta H_{gryo+sum} += \Delta H_{gryo}$ $\Delta H^s_{gryo+sum} = \Delta H_{gryo}(\Delta H_{gryo} + 2\Delta H_{gryo+sum})$ Else, $\Delta H_{gryo-sum} += |\Delta H_{gryo}|$
$\Delta H_{gryo-sum} += |\Delta H_{gryo}|(|\Delta H_{gryo}| + 2\Delta H_{gryo-sum})$ Else, $\Delta H^s_{gryo+sum} = 0$ $\Delta H^s_{gryo-sum} = 0$ $\Delta q_{SF} = \sigma^2_{SF+} \Delta H^s_{gryo+sum} + \sigma^2_{SF-} \Delta H_{gryo-sum}$
$q_{SF} += \Delta q_{SF}$
$\sigma^2_{SF-} += q_{\Delta H} \Delta t + \Delta q_{SF}.$ In the propagation sums, the terms $\Delta H_{gryo+sum}^s$, $\Delta H_{gryo-sum}$, $\Delta H_{gryo+sum}^s$, $\Delta H_{gryo-sum}$ and $q_{SF}$ are all preferably initialized to zero. The term $q_{\Delta H}$ is time varying. It is adapted as a function of the stability of the turning rate sensor gyro 22 bias as determined by its calibration history.

For covariance update equations, $\sigma_c$ is updated after a $\sigma_H^2$ update, and is described by equation (3), and $$\sigma_{Hk+1}^{2+} = (1-k)^2 \sigma_{Hk+1}^{2'} - k(1-k)$$
$$\sigma_{ck+1}^- + k^2 \sigma_{H/GPS}^2. \quad (10)$$

Tests are done on zeroing out heading (H) sums used in a propagation:

If, $\sigma_{Hk+1}^{2+} \leq V_{fraction} \cdot q_{SF}$, where: $V_{fraction} = 0.01$ (11)

-continued $\Delta H^s_{gryo+sum} = \Delta H_{gryo+sum} = 0$ $\Delta H^s_{gryo-sum} = \Delta H_{gryo-sum} = 0$ $q_{SF} = 0.$ This special handling of the effects of the gyro scale factor error represents a second distinction of the present invention relative to a conventional Kalman filter. This error is not well represented by white noise, since it is bias-like. These special summations are therefore required to force the filter to maintain conservatism, with respect to the heading error induced by gyro scale factor error. In order to avoid injecting too much conservatism, tests must be performed based upon the updated covariance (controlled by the parameter fraction), to reset the summations formed during the turn. An additional term is added to the GPS heading variance, equation (1), if the velocity solution is based on a propagated measurement.

The velocity (speed) filter 74 is implemented as a single-state, Kalman-like filter for estimating an error associated with an odometer scale factor from a GPS-derived velocity. A basic Kalman filter equations are adapted to improve correlated error component handling. Correlated velocity error develops either directly when operating non-differentially, or through leakage in differential corrections. Scale factor error is modeled as a Markov process with a fairly long time constant, e.g., 300-900 seconds. This time constant reflects a plurality of variations, e.g., those influences attributable to the effects on wheel radius due to tire pressure changes. Thus, this is a relatively slowly varying effect. Higher frequency variations in the scale factor are averaged out.

For example:

let $\hat{\delta}v_{SF}$ = odometer scale factor error state, $\sigma_c$ = error correlation induced by SA.

It is assumed that $\hat{\delta}v_{SF}$ is subtracted from the current odometer scale factor at each measurement update, e.g., as frequently as one Hz. It is therefore not necessary to propagate an error estimate. Letting $V_{GPS}$ = GPS-derived speed in meters per second, a measurement is formed as the difference, $$Z = V_o V_{GPS} \quad (12)$$

where:
$V_o$ = odometer derived velocity.
The measurement is therefore, $$Z = V \hat{\delta}v_{SF} - \delta v_{GPS},$$

where, V = true velocity. The measurement gradient "vector" is thus V, well approximated by $V_o$.

There is the possibility of a significant latency error between $V_o$ and $V_{GPS}$, which is preferably not neglected. The latency may be as much as one second, and can produce a significant impact, e.g., whenever vehicle 12 accelerations and decelerations are substantial. Therefore, a computed measurement noise variance is preferably increased by an estimated acceleration level, and is based on backward differencing odometer velocities, $$\hat{a} = (V_{o_k} - V_{o_{k-1}})/\Delta t \to \hat{a}\Delta t = V_{o_k} - V_{o_{k-1}}. \quad (13)$$

Computing measurement noise variances, $$\sigma^2_{VGPS} = [\sigma^2_{CVGPS} + \sigma^2_{Vn}] \, HDOP^2 + (\hat{a}\Delta t)^2/4 \qquad (14)$$

if differential mode: $\sigma^2_{CVGPS} = (\sigma_{asa}\Delta t_c)^2$, if non-differential mode: $\sigma^2_{CVGPS} = \sigma^2_{vsa}$, where:
- $\sigma_{vsa}$ = one-sigma PRR error from SA,
- $\sigma_{asa}$ = one-sigma PRR error from SA,
- HDOP = Horizontal Dilution of Precision associated with a current velocity fix, and,
- $\Delta t_c$ = average differential latency in seconds.

In dividing $\hat{a}\Delta t$ by four, the maximum error corresponding to a one second latency is identified as a two-sigma value. The HDOP may be increased when a solution is two-dimensional, owing to the use of a possibly incorrect, fixed altitude, as in equation (1).

Since the estimated scale factor error is applied to a whole valued estimate at each measurement update. It is not necessary to propagate $\delta v_{SF}$. However, the correlation term, $\sigma_c$ and $\sigma_{SF}^2$ are propagated, where $\sigma_c$ is initialized to zero.

Computing a state transition factor for SA—:

$$\phi_{SA} = \begin{cases} 1 - \Delta t/\tau_{SA} & \Delta t \leq \tau_{SA} \\ 0 & \Delta t > \tau_{SA} \end{cases} \qquad (15)$$

$$\sigma_{ck+1} = \phi_{SA} \, \sigma_{ck} \qquad (16)$$

$$\sigma^2_{SF} \mathrel{+}= (2\Delta t/\tau)(\sigma^2_{VSFSS} - \sigma^2_{VSF}),$$

where:
- $\tau$ = a time constant associated with odometer scale factor (typically 300–900 seconds), and,
- $\sigma_{VSFSS}^2$ = a steady-state error variance associated with the odometer scale factor error.

The value of $\sigma_{VSFO}^2$ need not be set to $\sigma_{VSFSS}^2$, especially if large initial uncertainty exists.

For "Kalman" gain computations, $$k = (V_o \, \sigma_{SF}^2 + \sigma_c)/(V_o^2 \, \sigma_{SF}^2 + 2V_o \, \sigma_c + \sigma_{VGPS}^2). \qquad (17)$$

For measurement updates,

Residual test: (parameters are $C_1$ and $C_2$), and $$\text{Resvar} = V_o^2 \, \sigma_{SF}^2 + 2V_o \, \sigma_c + \sigma_{VGPS}^2 \qquad (18)$$

If $(Z^2/\text{Resvar}) > C_1 \, k/C_1$,

If $(Z^2/\text{Resvar}) > C_2$ bypass update;

Covariance and correlation update:

$$\sigma_{SF}^2 = (1-kv)^2 \sigma_{SF}^2 - 2k(1-kv)\sigma_c + k^2 \sigma_{VGPS}^2, \qquad \text{and (19)}$$

$$\sigma_c = (1-kv)\sigma_c - k\sigma_{CVGPS}^2, \qquad (20)$$

where $\sigma_{CVGPS}^2$ represents the correlated component of the measurement error. An additional term is added to the computed measurement noise variance if the velocity solution is based on propagated measurements.

The position filter 76 uses corrected outputs of the heading and speed filters 72 and 74, and processes GPS receiver 16 position fixes. Two and three-dimensional and propagated solutions are included, albeit weighted differently. Kalman filter 76 is a two-state type that accounts for GPS receiver 16 error correlation due to SA and is used to process the data. The propagation equations for Kalman filter 76 begin with a construction of an average heading and velocity, using outputs from the heading and speed filters 72 and 74:

$$\hat{H}_{avg} = (\hat{H}_k + \hat{H}_{k-1})/2, \text{ and} \qquad (21)$$

$$\hat{V}_{avg} = (\hat{V}_k + \hat{V}_{k-1})/2, \qquad (22)$$

where the k subscript denotes "current" time, e.g., the time of the GPS receiver 16 position fix, or the time to which position is being propagated. Associated with these average values are the following average variances:

$$\sigma_{Havg}^2 = (\sigma_{Hk}^2 + \sigma_{hk-1}^2 + 2 \max (\sigma_{Hk}^2, \sigma_{Hk-1}^2))/4; \text{ and} \qquad (23)$$

$$\sigma_{Vavg}^2 = (\sigma_{Vk}^2 + \sigma_{Vk-1}^2 + 2 \max (\sigma_{Vk}^2, \sigma_{Vk-1}^2))/4 \qquad (24)$$

where $\sigma_V^2 = V^2 \sigma hd \, SF^2$. In both equations (23) and (24), an approximation to the correlation between successive values of heading and velocity error, respectively, is made. A correlation coefficient of one is assumed. The product of the standard deviations by the maximum variance is approximated, to avoid computing a square root. This is a conservative approximation.

The variances associated with east and north position error are propagated using equations (25) through (29).

$$\sigma_{\Delta Pe}^2 \mathrel{+}= \Delta d_{sum}^s (\sin^2 H_{avg} \, \sigma_{Havg}^2 + \cos^2 H_{avg} \, \sigma_{VSF}^2); \qquad (25)$$

$$\sigma_{\Delta Pn}^2 \mathrel{+}= \Delta d_{sum}^s (\cos^2 H_{avg} \, \sigma_{Havg}^2 + \sin^2 H_{avg} \, \sigma_{VSF}^2); \qquad (26)$$

$$\Delta \sigma_{sum}^2 \mathrel{+}= \Delta d_{sum}^s (\sigma_{Havg}^2 + \sigma_{VSF}^2); \text{ and} \qquad (27)$$

$$\sigma_{\Delta Pe \Delta Pn}^2 \mathrel{+}= \sin H_{avg} \, \Delta d_{sum}^s (\sigma_{VSF}^2 - \sigma_{Havg}^2) \qquad (28)$$

where, $$\Delta d_{sum}^2 = \Delta d^2 + 2 \Delta d \Delta d_{sum}, \qquad (29)$$

$$\Delta d_{sum} \mathrel{+}= \Delta d. \qquad (30)$$

The terms $\sin H_{avg}$ and $\cos H_{avg}$ are calculated previously as a part of the position propagation, and therefore need not be recalculated here.

Equations (25) through (30) represent the covariance propagation equations, except for the correlated error correlation propagation. State propagation equations are:

$$L_k = L_{k-1} + \Delta p_n/R_e \text{ (latitude in radians);} \qquad \text{and (31)}$$

$$\lambda_k = \lambda_{k-1} + \Delta p_e/(R_e \cos L) \text{ (latitude in radians).} \qquad (32)$$

In equations (31) and (32), $$\Delta p_e = \Delta d \sin H_{avg}, \qquad \text{and (33)}$$

$$\Delta p_n = \Delta d \cos H_{avg}, \qquad (34)$$

where, $\Delta d = V_{avg} \Delta t$.

Measurement processing begins with the creation of east and north position measurement residuals:

$$\Delta p_{e/res} = (\lambda_{DR} - \lambda_{GPS}) \cdot R_e \cos L \text{ (in meters)}; \quad \text{and (35)}$$

$$\Delta p_{n/res} = (L_{DR} - L_{GPS}) \cdot R_e, \text{ (in meters)} \quad (36)$$

where, $\lambda_{GPS}$, $L_{GPS}$ are the longitude and latitude of the current GPS receiver 16 fix in radians, respectively.

The position filter 76 forms the following estimates of the east and north components of the DR position error:

$$\Delta \hat{p}e = K_{ee} \Delta p_{e/res} + k_{en} \Delta p_{n/res} \text{ (in meters)}, \quad \text{and (37)}$$

$$\Delta \hat{p}n = K_{ne} \Delta p_{e/res} + k_{nn} \Delta p_{n/res} \text{ (in meters)}, \quad (38)$$

where, gains $k_{en}$, $k_{en}$, $k_{en}$ and $k_{en}$ are expressed in equations herein. Both residuals affect the east and north position error estimates, since the error components are correlated through the common heading and odometer errors.

The error estimates computed by equations (37) and (38) are used to correct propagated DR positions:

$$\hat{L}_k = \Delta \hat{p}n / R_e; \text{ and} \quad (39)$$

$$\hat{\lambda}_k = \Delta \hat{p}e / (R_e \cos L) \quad (40)$$

The gain terms: $k_{en}$, $k_{ne}$, $k_{ee}$ and $k_{nn}$, are computed by first forming intermediate variables:

$$\sigma_{ediff}^2 = \sigma_{eGPS}^2 - 2\sigma_{ce} + \sigma_{\Delta pe}^2; \quad (41)$$

$$\sigma_{ndiff}^2 = \sigma_{nGPS}^2 - 2\sigma_{cn} + \sigma_{\Delta pn}^2; \quad (42)$$

$$\sigma_{cdiff} = \sigma_{\Delta pe \Delta pn} - \sigma_{cen} - \sigma_{cne}; \quad (43)$$

$$\sigma_{cdiffe} = \sigma_{\Delta pe \Delta pn} - \sigma_{cen}; \quad (44)$$

$$\sigma_{cdiffn} = \sigma_{\Delta pe \Delta pn} - \sigma_{cne}; \quad (45)$$

$$\sigma_{eunc}^2 = \sigma_{\Delta pe}^2 - \sigma_{ce}; \text{ and} \quad (46)$$

$$\sigma_{nunc}^2 = \sigma_{\Delta pn}^2 - \sigma_{cn} \quad (47)$$

where:

$\sigma_{\Delta pe}^2$, $\sigma_{\Delta pn}^2$ and $\sigma_{\Delta pe \Delta pn}$ are propagated per equations (25) through (30), $\sigma_{ce}$, $\sigma_{cn}$, $\sigma_{cne}$ and $\sigma_{cen}$ are correlations which are propagated and updated and all initialized to zero, and $\sigma_{eGPS}^2$ and $\sigma_{nGPS}^2$ characterize the accuracy of a current fix.

When characterizing the current fix, it is assumed that only HDOP is available. Additional information, including EDOP, NDOP, a correlation term and residual information from an over-determined solution is preferable, but not strictly necessary. With only HDOP, the north and east position error components of a fix are assumed to be of equal variance and uncorrelated, e.g., $\sigma_{en} = 0$. The variances are computed as follows:

$$\sigma_{eGPS}^2 = \sigma_{nGPS}^2 = HDOP^2 (\sigma_{cp/GPS}^2 + \sigma_{pn}^2), \quad (48)$$

where:

$\sigma_{pn}^2$ = noise variance, about one meter square, $\sigma_{cp/GPS}^2$ = correlated error variance, which includes both multipath, correlation induced by the code carrier filter, and SA or SA-leakage, $$= \sigma_{cp/SA}^2 + \sigma_{cp}^2$$

$$\sigma_{cp/SA}^2 = \begin{cases} \text{differential:} & \dfrac{\sigma_{asa}^2 \Delta tc^2}{2} + \sigma_{diff}^2(UDRE) \\ \text{non-differential:} & \sigma_{corr}^2 \end{cases},$$

and $$\sigma_{corr}^2 = (30 \text{ meters})^2.$$

If UDRE is not available from GPS receiver 16, then a constant value for $\sigma_{diff}^2$ is assumed.

For gain equations:

$$det = \sigma_{ediff}^2 \sigma_{ndiff}^2 - \sigma_{cdiff}^2, \quad (49)$$

$$k_{ee} = (\sigma_{ndiff}^2 \sigma_{eunc}^2 - \sigma_{cdiff} \sigma_{cdiffn})/det, \quad (50)$$

$$k_{en} = (\sigma_{ediff}^2 \sigma_{cdiffn} - \sigma_{cdiff} \sigma_{eunc}^2)/det, \quad (51)$$

$$k_{ne} = (\sigma_{ndiff}^2 \sigma_{cdiffe} - \sigma_{cdiff} \sigma_{nunc}^2)/det, \quad \text{and (52)}$$

$$k_{nn} = (\sigma_{ediff}^2 \sigma_{nunc}^2 - \sigma_{cdiff} \sigma_{cdiffe})/det. \quad (53)$$

For covariance and correlation update:

$$\sigma_{\Delta pe}^2 = k_{ee}^2 \sigma_{eGPS}^2 + 2k_{ee}(1 - k_{ee})\sigma_{ce} + (1 - k_{ee})^2 \sigma_{\Delta pe}^2 - 2k_{ee}k_{en}\sigma_{cen} - 2(1 - k_{ee})k_{en}\sigma_{cdiffn} + k_{en}^2 \sigma_{ndiff}^2 \quad (54)$$

$$\sigma_{\Delta pn}^2 = k_{nn}^2 \sigma_{nGPS}^2 + 2k_{nn}(1 - k_{nn})\sigma_{cn} + 2k_{nn}k_{ne}\sigma_{\Delta pn}^2 2(1 - k_{nn})k_{ne}\sigma_{cdiffe} + k_{ne}^2 \sigma_{ediff}^2 \quad (55)$$

$$\sigma_{\Delta pe \Delta pn} = k_{ee}(1 - k_{nn})\sigma_{cen} - k_{ee}k_{ne}(\sigma_{ce} - \sigma_{eGPS}^2/c) + k_{nn}(1 - k_{ee})\sigma_{cne} + (1 - k_{ee})(1 - k_{nn})\sigma_{\Delta pe \Delta pn} - (1 - k_{ee})k_{ne}\sigma_{eunc}^2 - k_{nn}k_{en}(\sigma_{cn} - \sigma_{nGPS}^2/c) - (1 - k_{nn})k_{en}\sigma_{nunc}^2 + k_{en}k_{ne}\sigma_{cdiff}, \quad (56)$$

$$\sigma_{cn} = -k_{nn}\sigma_{nGPS}^2/c - (1 - k_{nn})\sigma_{cn} + k_{ne}\sigma_{cne}, \quad (57)$$

$$\sigma_{ce} = -k_{ee}\sigma_{eGPS}^2/c - (1 - k_{ee})\sigma_{ce} + k_{en}\sigma_{cen}, \quad (58)$$

$$\sigma_{cen} = -(1 - k_{nn})\sigma_{cen} + k_{ne}(\sigma_{ce} - \sigma_{eGPS}^2/c), \text{ and} \quad (59)$$

$$\sigma_{cne} = -(1 - k_{ee})\sigma_{cne} + k_{en}(\sigma_{cn} - \sigma_{nGPS}^2/c), \quad (60)$$

where:

$\sigma_{nGPS/c}^2 = \sigma_{eGPS/c}^2 = HDOP^2 \sigma_{cp/GPS}^2$.

For the time propagations of the correlations:

$$\sigma_{cn} = \Phi_{SA} \sigma_{cn}, \quad (61)$$

$$\sigma_{ce} = \Phi_{SA} \sigma_{ce}, \quad (62)$$

$$\sigma_{cen} = \Phi_{SA} \sigma_{cen}, \text{ and} \quad (63)$$

$$\sigma_{cne} = \Phi_{SA} \sigma_{cne}. \quad (64)$$

The correlations in equations (61) through (64) represent the effects of SA, but other effects may be included, e.g., uncompensated ionospheric delay.

If a position solution is based on propagated measurements, then additional terms which reflect the result of sensed acceleration on the computed position are added to the GPS receiver 16 measurement error variance.

Both $\Delta d_{sum}$ and $\Delta \sigma_{psum}^2$ are reset to zero whenever the updated variances $\sigma_{\Delta pe}^2$ and $\sigma_{\Delta pn}^2$ will pass the following test:

$$\sigma_{\Delta p}^2 = \sigma_{\Delta pe}^2 + \sigma_{\Delta pn}^2 + 2\sigma_{\Delta pe \Delta pn}. \quad (65)$$

If $\sigma_{\Delta p}^2 < V_{fraction} \Delta \sigma_{psum}^2$, $V_{fraction} = 0.01$
$\Delta d_{sum} = 0$, and $\Delta \sigma_{psum}^2 = 0$.

A significant simplification to the preceding equations for the two-state position filter, e.g., equations (25)–(28) and (54)–(56), can be obtained if it is assumed that the measurement processing of the two filters can be decoupled. Equations (37) and (38) would thereby become, $$\Delta \hat{p}e = k_{ee} \Delta p_{e/res}, \text{ and} \quad (66)$$

$$\Delta \hat{p}n = k_{nn} \Delta p_{n/res}. \quad (67)$$

This approximation basically neglects the correlation between east and north position error, and the two-state filter decouples into two single-state filters. There is also no longer a need to implement equation (28), since the correlation no longer appears in the measurement processing equations. Verification of the operation of the simplified design has indicated that the performance losses are not significant. It is therefore a reasonable alternative which results in substantial computational savings. The values for the gains in the two decoupled filters are given by, $$k_{ee} = k_e = (\sigma^2 \Delta pe - \sigma_{ce}) / (\sigma^2 \Delta pe - 2\sigma_{ce} + \sigma_{eGPS}^2), \text{ and} \quad (68)$$

$$k_{nn} = k_n = (\sigma^2 \Delta pn - \sigma_{cn}) / (\sigma^2 \Delta pn - 2\sigma_{cn} + \sigma_{nGPS}^2). \quad (69)$$

The covariance update equations simplify to, $$\sigma_{\Delta pe}^2 = k_e^2 \sigma_{eGPS}^2 + 2 k_e (1-k_e)\sigma_{ce} + (1-k_e)^2 \sigma_{\Delta pe}^2, \text{ and} \quad (70)$$

$$\sigma_{\Delta pn}^2 = k_n^2 \sigma_{nGPS}^2 + 2 k_n (1-k_n)\sigma_{cn} + (1-k_n)^2 \sigma_{\Delta pn}^2. \quad (71)$$

Therefore, two, rather than the previously required four, correlations are needed. Their propagation equations are, $$\sigma_{ce} = (1-k_e)\sigma_{ce} + k_e \sigma_{cpGPS}^2, \text{ and} \quad (72)$$

$$\sigma_{cn} = (1-k_n)\sigma_{cn} + k_n \sigma_{cpGPS}. \quad (73)$$

The preferred heading filter 78 combines individual GPS pseudo-range rate (PRR), or Doppler measurement, from GPS receiver 16, an odometer-derived linear velocity from input signal 14 and a gyro-derived heading rate, such as from gyro 22. A differential odometer may be used in place of gyro 22 to sense heading changes. Differential odometers measure differences in the distances traversed by the left and right sides of vehicle 12. Preferred heading and speed filter 78 operates continuously, processing PRR measurements from individual GPS satellites. Since one or more GPS satellites are expected to be in view most of the time, a substantial performance advantage relative to the enhanced heading filter is probable during periods of dependency on dead-reckoning.

Preferred heading and speed filter 78 is mechanized as a four-state Kalman filter of (1) gyro or differential odometer heading error, (2) odometer scale factor error, (3) terrain slope and (5) local clock frequency error. The first state includes a gyro drift component, the variance of which is proportional to time duration and error induced by residual scale factor error. The second state represents the residual scale factor error of the odometer itself, modeled as a relatively slowly varying Markov process. The third state models the local slope of the terrain as a spatially varying Markov process with standard deviation and correlation distance parameters set by a user as a function of the expected terrain roughness. The fourth state represents the error in the frequency standard of the GPS receiver.

Two modifications are made to an otherwise conventional Kalman filter. Process noise is adapted to cope with scale factor errors, and correlated measurement error processing is added. The measurement error correlations in the conventional Kalman filter covariance propagation and update equations are explicitly accounted for.

TABLE I

Preferred Heading and Speed Filter State Definition Notation

| State | Description | State Model | Use |
|---|---|---|---|
| $\hat{\delta}H$ | estimated error in the propagated gyro or differential odometer heading in radians | zeroed out following incorporation of each measurement after propagated heading is corrected | can be used to refine the gyro or differential odometer scale factor |
| $\hat{\delta}S$ | estimated local terrain slope | modeled as a Markov process, with an a priori error variance and correlation distance computed from terrain roughness specifications | this state is included when operating with a full set of satellites and vertical velocity is significant |
| $\hat{\delta}d_{SF}$ | estimate of the residual, linear odometer scale factor error | modeled as a Markov process, with an a priori error variance that reflects the accuracy of an initial calibration and a time constant that reflects the variability of tire pressure with temperature, the shorter term variations expected due to vehicle 12 velocity are thus averaged | |
| $\hat{\delta}f$ | estimate of local clock frequency error | modeled as a random walk, with process noise selected to represent the frequency error stability | |

All states except $\hat{\delta}H$ are free-running, e.g., they are not normally set to zero following each measurement update. The odometer scale factor, if adjusted, should result in $\hat{\delta}d_{SF}$ being reset to zero.

Only ten elements of a four-by-four covariance matrix, equation (66), are propagated and updated for maximum efficiency, as illustrated in equation (74), $$P = \begin{bmatrix} \sigma^2_{\delta H} & x & x & x \\ \sigma_{\delta H \delta s} & \sigma^2_{\delta s} & x & x \\ \sigma_{\delta H \delta d} & \sigma_{\delta s \delta d} & \sigma^2_{\delta d} & x \\ \sigma_{\delta H \delta f} & \sigma_{\delta s \delta f} & \sigma_{\delta d \delta f} & \sigma^2_{\delta f} \end{bmatrix}, \quad (74)$$

where "x" are redundant and ignored.

In addition to the four basic filter states, there is a "consider" state that represents the effects of selective availability for non-differential operation or selective availability leakage for differential operation. This "consider" state implies that four additional correlations per satellite must be included in the covariance update and propagation equations. These correlations are labeled $\sigma_{c\delta Hi}$, $\sigma_{c\delta Si}$, $\sigma_{c\delta di}$, and $\sigma_{c\delta fi}$, where $i = 1, 2, \ldots, n$, where i is the satellite index, and n denotes the number of receiver channels.

A set of equations identical to the corresponding equations for the propagation of the heading error variance due to scale factor error for the enhanced heading filter is required. For example, pseudocode (7), which is given for the heading sums, is equally applicable to the preferred heading filter.

The following pseudocode describes propagations for the odometer scale factor and slope states:

If $\Delta d \geq d_{corr}$ (the slope correlation distance)

$$\hat{\delta s}_{k+1} = 0, \quad (75)$$
$\sigma^2_{\delta s k+1} = \sigma^2_{\delta s s}$ (steady state slope variance),
$\sigma_{ss\delta H k+1} = \sigma_{ss\delta d k+1} = \sigma_{ss\delta f k+1} = 0,$
$\sigma_{c\delta s i} = 0, \quad i = 1, 2, \ldots, n,$
else,
$\phi_{\delta s} = 1 - (\Delta d/d_{corr})$ ($1/d_{corr}$ should be precomputed),
$\hat{\delta s}_{k+1} = \phi_{\delta s} \hat{\delta s}_k$
$\sigma^2_{\delta s k+1} += 2(\Delta d/d_{corr}) (\sigma^2_{\delta s s} - \sigma^2_{\delta s k}),$
($2/d_{coor}$ should be precomputed)
$\sigma_{\delta s \delta H k+1} = \phi_{\delta s} \sigma_{\delta s \delta H k},$
$\sigma_{\delta s \delta d k+1} = \phi_{\delta s} \sigma_{\delta s \delta d k},$ and
$\sigma_{\delta s \delta f k+1} = \phi_{\delta s} \sigma_{\delta s \delta f k}.$ If $\Delta t \geq \tau_{corr}$ (the scale factor correlation time), $$\hat{\delta d S F}_{k+1} = 0, \quad (76)$$
$\sigma^2_{\delta d k+1} = \sigma^2_{\delta s s},$
$\sigma_{\delta s \delta H k+1} = \sigma_{\delta s \delta s k+1} = \sigma_{\delta s \delta f k+1} = 0,$
$\sigma_{c\delta d i} = 0, \quad i = 1, 2, \ldots, n,$
else,
$\phi_{\delta d} = 1 - (\Delta t/\tau_{corr}),$ ($1/\tau_{corr}$ should be precomputed)
$\hat{\delta d S F}_{k+1} = \phi_{\delta d} \hat{\delta d S F}_k$
$\sigma^2_{\delta d k+1} += 2(\Delta t/\tau_{corr}) (\sigma^2_{\delta s s} - \sigma^2_{\delta d k}),$
($2/\tau_{coor}$ should be precomputed)
$\sigma_{\delta d \delta H k+1} = \phi_{\delta d} \sigma_{\delta d \delta H k},$
$\sigma_{\delta d \delta s k+1} = \phi_{\delta d} \sigma_{\delta d \delta s k},$ and
$\sigma_{\delta d \delta f k+1} = \phi_{\delta d} \sigma_{\delta d \delta f k}.$ Propagation of the clock frequency variance is given by $\sigma_{\delta f}^2 += q_{\delta f} \Delta t.$ The propagation of the "consider" state correlations is represented by the following pseudocode.

$\sigma_{c\delta H i} = \sigma_{c\delta S i} = \sigma_{c\delta d i} = \sigma_{c\delta f i} = 0 \quad (77)$
$i = 1, 2, \ldots, n$
else,
$\phi_c = 1 - (\Delta t/\tau_c),$
($1/\tau_{corr}$ should be precomputed)
$\sigma_{c\delta H k+1} = \phi_c \sigma_{c\delta H k},$ -continued
$\sigma_{c\delta S k+1} = \phi_c \sigma_{c\delta S k}, \quad i = 1, 2, \ldots, n,$ and
$\sigma_{c\delta d k+1} = \phi_c \sigma_{c\delta d k},$ and
$\sigma_{c\delta f k+1} = \phi_c \sigma_{c\delta f k},$ where n is the number of GPS satellites currently being tracked.

Measurement processing, as described for a single PRR measurement, is as follows, let PRR measurements be denoted $PRR_i^m$, $i = 0, 1, \ldots, n.$ The differential correction latency, $\Delta t_c$, should be stored in a memory within microcomputer 24 for later use in computing a correlated error variance.

It is assumed that the PRRs have been corrected for satellite vehicle (SV) clock frequency error, including relativistic effects, and for SV velocity error. If in non-differential mode, different values will be assigned to the correlated error variances. When in differential mode and differential corrections are not available or have timed-out, it may or may not be desirable to continue to use the PRR measurements. If the use of PRR measurements is continued, the correlations must be reset.

Computation of the measurement gradient vector ($\underline{h}$), for each PRR measurement, is given by, $$\underline{h}^T = \{v[\cos H\, u_e - \sin H\, u_n \,|\, \sin H\, u_e + \cos H \, u_n + u_u \delta S \,|\, u_u ]1\} \quad (78)$$

where $u_e$, $u_n$ and $u_u$ are the east, north and up components, respectively, of the line-of-sight (LOS) vectors to the SV of interest.

Residual formation is as follows, $$r_{PRR} = P\hat{R}R - \underline{h}^T \underline{\hat{x}}, \text{ tm} \quad (79)$$

where,
$P\hat{R}R = \underline{u}_i (\underline{v}_{si} - \underline{\hat{v}})$ ($\underline{v}_s$ denotes SV velocity, $\underline{v}$ denotes vehicle 12 velocity)
$\underline{\hat{x}}^T = [\hat{\delta} H \, \hat{\delta} S \, \hat{\delta} d_{SF} \, \hat{\delta} f].$ Measurement noise variance computation is as follows, $$\sigma^2_{PRR} = \underset{\text{noise component}}{\sigma^2_{PRRN}} + \underset{\text{correlated}}{\sigma^2_{PRRC}} \quad (80)$$

$$\sigma^2_{PRRN} = (0.01 \text{ m/sec})^2 \quad (81)$$

$$\sigma^2_{PRRC} = \begin{cases} \sigma_a^2 \Delta t_c^2 & \text{differential} \\ (0.5 \text{ m/sec})^2 & \text{non-differential} \end{cases} \quad (82)$$

where,
$\Delta t_c$ = differential correction latency
$\sigma_{asa}$ = one sigma SA acceleration = 0.005–0.01 m/sec$^2$. The correlated error is dominated by SA. The other correlated errors, e.g., ionospheric rate of change, are neglected. These errors can be used to set a floor for the propagated correlations.

Measurement gain calculation is not strictly a Kalman gain, but a modified version based on the correlation vector, $\underline{\sigma}_c$, as follows, $$\underline{\sigma}_c^T = [\sigma_{c\delta H} | \sigma_{c\delta S} | \sigma_{c\delta d} | \sigma_{c\delta f}]. \quad (83)$$

The expression for the Kalman gain (four-dimensional) is, $$\underline{k} = (P\underline{h} - \underline{\sigma}_c)/(\sigma_{PRR}^2 + \underline{h}^t P\underline{h} - 2\underline{\sigma}_c^t\underline{h})$$
$$= (P\underline{h} - \underline{\sigma}_c)/PRR_{resvar} \quad (84)$$

A conventional Kalman filter gain calculation results if $\underline{\sigma}_c = \underline{0}$. Iterations of the Kalman gain calculation, followed by state, covariance and correlation vector update for each satellite are required.

State update is as follows, $$\hat{\underline{x}}^+ = \underline{k}\, r_{PRR} \quad (85)$$

Measurement deweight/reject pseudocode is,

If $r_{PRR}^2 > c_1\, PRR_{res\_var}$ (86)
$\underline{k} \leftarrow \underline{k}/c_1$ If $r_{PRR}^2 > c_2\, PRR_{res\_var}$
bypass update.

The covariance update equation is, $$P^+ = (I - \underline{k}\underline{h}^T)P^-(I - \underline{k}\underline{h}^T)^T + \underline{k}\underline{k}^T \sigma_{PRR}^2 + (I - \underline{k}\underline{h}^T)$$
$$\underline{\sigma}_c\underline{k}^T + \underline{k}\underline{\sigma}_c^T(I - \underline{k}\underline{h}^T)^T \quad (87)$$

The correlation update equation is, $$\underline{\sigma}_c^+ = (I - \underline{k}\underline{h}^T)\underline{\sigma}_c^- + \underline{k}\sigma_{PRR}^2 \quad (88)$$

The preferred position filter 80 (FIG. 3) operates in a manner analogous to the preferred heading and speed filter (69): individual satellite PR measurements are processed to estimate and remove the error growth in the position propagation, which is based upon the outputs of the heading and speed filter. Processing of individual measurements using the four state preferred position filter enables "partial updating" of the solution when fewer than three satellites are in view. The measurement processing of the preferred position filter is nearly independent of the preferred heading and speed filter, except that its measurement weighting is coupled to the expected accuracies of the heading and speed filter, as will be explained in the subsequent discussions. In this way, the two filters realize a set of coupled, Kalman-like filters; this formulation has significantly reduced computational requirements relative to the use of a fully integrated eight state design, by roughly a factor of four. The error states of the preferred position filter are defined in Table II.

TABLE II

| | Preferred Position Filter State Definition | |
|---|---|---|
| State | Description | Use |
| $\hat{\delta}p_e$ | estimated error in the east component of DR position in meters | to be subtracted from DR solution |
| $\hat{\delta}p_n$ | estimated error in the north component of DR position in meters | to be subtracted from DR solution |
| $\hat{\delta}h$ | estimated error in the vertical component of DR position in meters | to be subtracted from DR solution |
| $\hat{\delta}\phi$ | estimate of user clock phase error | to be subtracted from DR solution |

The following ten elements of the full four-by-four covariance matrix are propagated:

$$P = \begin{bmatrix} \sigma_{\delta pe}^2 & x & x & x \\ \sigma_{\delta pe\delta pn} & \sigma_{\delta pn}^2 & x & x \\ \sigma_{\delta pe\delta h} & \sigma_{\delta pn\delta h} & \sigma_{\delta h}^2 & x \\ \sigma_{\delta pe\delta\phi} & \sigma_{\delta pn\delta\phi} & \sigma_{\delta h\delta\phi} & \sigma_{\delta\phi}^2 \end{bmatrix} \quad (89)$$

Thus, propagation equation are needed for $\sigma_{\delta pe}^2$, $\sigma_{\delta pe\delta pn}$, $\sigma_{\delta pn}^2$, $\sigma_{\delta pe\delta h}$, $\sigma_{\delta pn\delta h}$, $\sigma_{\delta h}^2$, $\sigma_{\delta pe\delta\phi}$, $\sigma_{\delta pn\delta\phi}$, $\sigma_{\delta h\delta\phi}$, and $\sigma_{\delta\phi}^2$, based on the outputs from the preferred heading and speed filter. It is assumed that the preferred heading and speed filter has run prior to the execution of the preferred position filter. Subscripts k and k−1 refer to successive updates, or propagations if no PRR measurements are available for the speed and heading filter. For example, k is the time at which propagation terminates in the position filter, and k−1 is the previous propagation termination time. The propagation equations are preferably run at one hertz, independent of measurement updating.

Propagation of the vertical position error variance is derived from equations for the altitude propagation, based on the current and previous slope and speed estimates. Such equations take the form of:

$$\hat{h}_k = \hat{h}_{k-1} + (\hat{s}_{avg})(\hat{v}_{avg})\Delta t \quad (90)$$

where:

$$\hat{s}_{avg} = \tfrac{1}{2}(\hat{s}_{k-1} + \hat{s}_k) \quad \hat{v}_{avg} = \tfrac{1}{2}(\hat{v}_{k-1} + \hat{v}_k)$$

$$\sigma_{\delta s avg}^2 = \tfrac{1}{4}[\sigma_{\delta Sk-1}^2 + 2\max(\sigma_{\delta Sk-1}^2, \sigma_{\delta Sk}^2) + \sigma_{\delta Sk}^2]$$

$$\sigma_{\delta v avg}^2 = \tfrac{1}{4}\hat{v}_{avg}^2[\sigma_{\delta vSFk-1}^2 + 2\max(\sigma_{\delta vSFk-1}^2, \sigma_{\delta vSFk}^2) + \sigma_{\delta vSFk}^2]$$

or, $$\sigma_{\delta v avg}^2 = \tfrac{1}{4}\hat{v}_{avg}^2 \sigma_{\delta S\delta vSFavg}$$

The resulting altitude variance propagation equation is given by:

$$\sigma_{\delta h_k}^{2+} = \Delta d_{sum}^s(\sigma_{\delta Savg}^2 + \hat{S}^2 \sigma_{\delta vSFavg}^2 + 2S_{avg}\sigma_{\delta S\delta vSF}) \quad (91)$$

where:

$\Delta_{sum}^s$ is computed similarly to the computations for the enhanced position filter, e.g., equation (17).

Propagation of the clock phase error covariance is based upon the following equation for the clock phase estimate:

$$\delta\hat{\Phi}_{k+1} + \delta\hat{\Phi}_k + \delta\hat{f}_{avg}\Delta t, \quad (92)$$

where:

$$\hat{\delta f}_{avg} = \tfrac{1}{2}(\hat{\delta f}_{k-1} + \hat{\delta f}_k).$$

The resulting clock error variance propagation equation is given by:

$$\sigma_{\delta\Phi}^2 + = q_{\delta\Phi}\Delta t + \sigma_{\delta favg}^2 \Delta t_{sum}^2, \quad (93)$$

where: $\Delta t_{sum}$ is computed and controlled the same as $\Delta t_{sum}^s$, but based upon sums of propagation intervals.

Propagation of the off-diagonal terms: $\sigma_{\delta pe \delta h}$, $\sigma_{\delta pn \delta h}$, $\sigma_{\delta pe \delta \Phi}$, $\sigma_{\delta pn \delta \Phi}$, and $\sigma_{\delta ph \delta \Phi}$, are given by:

$$\sigma_{\delta\Phi\delta h} + = \nu(\sigma_{\delta S\delta f} + S\sigma_{\delta v SF \delta f})\Delta t_{sum}^s, \quad (94)$$

$$\sigma_{\delta\Phi\delta pe} + = \nu(\cos H \sigma_{\delta S\delta f} + \sin H \sigma_{\delta v SF \delta f})\Delta t_{sum}^s, \quad (b\ 95)$$

$$\sigma_{\delta\Phi\delta pn} + = \nu(\cos H \sigma_{\delta v SF \delta f} - \sin H \sigma_{\delta H \delta f})\Delta t_{sum}^s, \quad (96)$$

$$\sigma_{\delta h \delta pe} + = [S(\cos H \sigma_{\delta v SF \delta H} + \sin H \sigma_{\delta v SF}^2) + \cos H \sigma_{\delta S \delta H} + \sin H \sigma_{\delta v SF \delta S}]\Delta d_{sum}^s, \quad (97)$$

$$\sigma_{\delta h \delta pn} + = [S(\cos H \sigma_{\delta v SF}^s - \sin H \sigma_{\delta v SF \delta H}) + \cos H \sigma_{\delta SF \delta S} - \sin H \sigma_{\delta v SF \delta S}]\Delta d_{sum}^s, \quad (98)$$

A correlation term for each satellite, representing the effects of SA or SA leakage (differential operation) and other residual correlated errors such as uncompensated ionospheric delay, must be propagated for each SV:

$$\sigma_{c\delta pei} = \Phi_c, \quad (99)$$

$$\sigma_{c\delta pni} = \Phi_c, \quad (100)$$

$$\sigma_{c\delta hi} = \Phi_c, \quad (101)$$

$$\sigma_{c\delta\Phi i} = \Phi_c, \quad (102)$$

where i is the SV index.

The pseudo range measurements are code/carrier filtered, corrected for SV clock and relativistic effects, ionospheric and tropospheric delays, or differentially corrected. Measurement residual formation is as follows:

$$PR_{resi} = PR_i^m - \hat{R}_i - \delta\hat{\Phi} - \underline{u} \cdot \delta \underline{p}, \quad (103)$$

where:
$PR^m$ is the measured carrier-filtered pseudo range,
$\hat{R}$ is the estimated range, based on the propagated position, and
$\delta\underline{p}^T = [\delta\hat{p}_e, \delta\hat{p}_n, \delta\hat{p}_h]$ represents the computed SV positions.

The measurement gradient vector equation is as follows:

$$\underline{h}_i^T = [u_{ei}\ u_{ni}\ u_{ui}\ 1], \quad (104)$$

where:
i is the SV index, and
$u_e$, $u_n$, $u_u$ are the components of unit line of sight vector to SV.

The Kalman gain calculation is identical in form to that for pseudo range rate processing, with the correlation vector $\underline{\sigma}_{ci}$ given by, $$\underline{\sigma}_{ci}^T = [\sigma_{c\delta pe}\ \sigma_{c\delta pn}\ \sigma_{c\delta h}\ \sigma_{c\delta\Phi}]. \quad (105)$$

The measurement noise variance is given by, $$\sigma_{PR}^2 = \sigma_{NPR}^2 + \sigma_{CPR}^2, \quad (106)$$

where:
$\sigma_{NPR}^2$ represents the noise contribution,
$\sigma_{CPR}^2$ represents the correlated error contribution due largely to SA.

Each component is a function of several receiver-generated parameters:

$$\sigma_{NPR}^2 = f(C/N_o, n), \quad (107)$$

where:
$C/N_o$ = measured signal to noise ratio,
n = index for code/carrier filter gain, $$\sigma_{CPR}^2 = \begin{cases} \sigma_{SA(URA)}^2 & \text{non-differential} \\ \sigma_{ASA\Delta t/2}^2 & \text{differential}. \end{cases}$$

The covariance update equations and correlation update equations are identical in form to those described herein for the heading and speed filter, equations (3) and (5).

The gyro bias filter and associated monitor are preferably included the GPS/DR navigation system. The gyro itself generally exhibits drift characteristics that can render it unusable without frequent calibration. The present invention performs this calibration function each time that a vehicle 12 is determined to be stationary, such as indicated by the odometer. The calibration can also be done when the vehicle 12 is determined to be moving in a straight line, as determined from a very low rate signal. This information is input to one of two separate filters, one using the stationary information, the second (with a longer smoothing time) using the bias information derived while moving. Both filters can be realized as fixed-gain, low-pass filters, which are empirically tuned.

Alternatively, single or two-state Kalman filters may be used in these designs. The gyro bias rate, in addition to the gyro bias, is estimated. Inclusion of gyro bias rate information can improve the bias estimation performance over longer periods of continuous motion, since it can predict the change in the determined bias over time.

Fixed gain bias filtering is as follows:

$$\hat{b}_{k+1} = \hat{b}_k + \alpha(b^m - \hat{b}_k), \quad (108)$$

where:
$\hat{b}$ = bias estimate,
$\alpha$ = filter coefficient, and
$b^m$ = measured bias value.

The value for $\alpha$ is a function of the source of the bias measurement. A longer time constant which corresponds to a smaller value for $\alpha$ is used if $b^m$ is derived while moving.

The Kalman bias filter is represented by:

$$\hat{x} = \begin{pmatrix} \hat{b} \\ \hat{\dot{b}} \end{pmatrix} \quad \hat{x} = \text{Kalman state vector} \quad (109)$$

$$\hat{b}_{k+1} = \hat{b}_k + k_b b_{res}, \quad (110)$$
$$\hat{\dot{b}}_{k+1} = \hat{\dot{b}}_k + k_{\dot{b}} b_{res}, \quad (111)$$
$$b_{res} = b^m - (\hat{b}_k + \hat{\dot{b}}\Delta t), \quad (112)$$

$k_b$ = Kalman gain for the bias estimate, $k_b$=Kalman gain for the bias rate estimate,
$\Delta t$=time interval between bias measurements.

The Kalman gains are derived from conventional Kalman equations, based on the assignment of a measurement noise variance for the bias measurement, which varies according to its source, whether moving or stationary. The Kalman gains are further based on an appropriate random walk model for the bias-rate state.

Due to the potential instability of the gyro bias, an a gyro bias monitor is preferably included in the gyro bias filter. The gyro bias monitor examines the outputs of the bias filter, and injects additional uncertainty into the speed and heading filter propagation, which results in an increase in the weighting of GPS information, based upon the stability of the outputs of the bias filter. The equations of the bias filter and its monitor are included below:

The following pseudocode represents a gyro bias monitor procedure:

$$\text{if } \Delta b^2 \cdot \Delta t > q_{bias} \quad (113)$$

$$q_{bias} = \Delta b^2 \cdot \Delta t$$

else $$q_{bias} = q_{bias} - c(q_{bias} - q_{bias}\text{nominal})$$

where:
$\Delta b = \hat{b}_{k+1} - \hat{b}_k$,
$\Delta t$=time,
$q_{bias}$=process noise parameter used by the speed and heading filter, and
c=coefficient which determines the "settling time" associated with the return of $q_{bias}$ to its nominal value.

The bias monitor is relatively conservative, e.g., any observed departures of the bias from its nominal stability results in an immediate increase in the $q_{bias}$ parameter. The $q_{bias}$ parameter is only allowed to return to its (lower) nominal value after several consistent updates, as controlled by "c".

Depending upon the stability of the gyro scale factors, which are generally expected to be strongly temperature dependent, periodic re-calibration from their initial values determined at installation may be necessary. The calibration generally requires specific maneuvers be performed, which can be difficult and time consuming. It is therefore advantageous to adjust the scale factor estimates periodically using GPS. Such adaptation is risky, since an erroneous scale factor may be difficult to recover from. An alternative approach makes use of a GPS-derived estimate of the scale factor following each significant heading variation. This avoids corruption of the gyro scale factors. The GPS information is weighted based upon its expected accuracy, and combined with the scale factor determined at installation. In this way, the scale factor will only be adjusted if significant evidence indicates that it has changed, e.g., the scale factor estimate is desensitized to errant GPS measurements.

The following pseudocode represents a gyro scale factor update filter procedure:

$$\text{if } \Delta H_{gyro} > \Delta H_{thresh} \quad (114)$$

$$SF_+{}^m = (\Delta H_{gyro}/\Delta H_{GPS}) - 1$$

$$\text{else if } \Delta H_{gyro} < -\Delta H_{thresh}$$

$$SF_-{}^m = (\Delta H_{gyro}/\Delta H_{GPS}) - 1$$

where:
$SF^m$=measured positive and negative gyro scale factors,
$\Delta H_{gyro}$=gyro measured heading change,
$\Delta H_{thresh}$=heading change threshold for scale factor measurement, and
$\Delta H_{GPS}$=heading change measured by GPS.

The measured $SF^m$ values are then applied to separate positive and negative filters for scale factor, where each is in the following form:

$$\hat{SF}_{k+1} = (1-\alpha)\hat{SF}_k + \alpha SF^m{}_k \quad (115)$$

where:
$\alpha$=function of accuracy of GPS measurement, time since last gyro scale factor calibration,
$\hat{SF}_O$=value determined at installation or recalibration.

An alternative to the use of Kalman filtering for the preferred speed and heading filter, and the preferred position filter is based on a weighted least squares (WLS) algorithm, although the Kalman filter approach is presently preferred. One such alternative approach is based upon dual four-state WLS filters and closely follows the development of the dual four-state Kalman filters described herein for the preferred speed and heading and position filters. Therefore, it will not be described to the same level of detail.

The propagation equations for the WLS approach are virtually identical, except that propagations are not required for the correlations with GPS measurement error (since the WLS filter does not model these effects). The measurement update equations are more straightforward than their Kalman counterparts, and are summarized by the following equations:

$$\hat{\underline{\Delta}}_x = (H^T R^{-1} H)^{-1} H^T R^{-1} \underline{r}$$

$R$=measured error variance ($m \times m$)

$\underline{r}$=measured residual vector ($m \times 1$)

$H$=measurement gradient vector ($m \times 4$)

$\hat{\underline{\Delta}}_x$=state correction vector ($4 \times 1$)

where $m = 4 + n_{svs}$ and $n_{svs}$=number of GPS satellites.

The alternative design based upon WLS can be expected, generally, to be inferior to the preferred Kalman approach in that it will not be able to remove the effects of SA as well. However, its relative simplicity makes it an attractive alternative, especially in applications with limited processing power. The measurement equations of WLS do permit navigation with fewer that three satellites, and identification of faults in both GPS and DR. Based upon limited benchmarks for a Motorola type 68332 microprocessor, the measurement processing of the WLS approach can be up to an order of magnitude more efficient than the Kalman approach, and so it is worthy of serious consideration as a backup approach if computer resources limited.

Failure detection, as implemented within the WLS filters, is based upon the over-determined solution residuals, e.g., the fault vector or parity vector. The magnitude of the fault vector can be tested against a threshold, and used to detect "failures", or inconsistencies, in the redundant measurements. While the direction of the fault vector can be used to isolate the faulty measurement(s). If a faulty GPS measurement is isolated, it will be removed from the solution. If the position changes or the gyro-derived heading are isolated as faulty, a reinitialization to the next available GPS solution should occur. The following equations summarize the calculation of the fault vector from the over-determined set of measurements:

$$\underline{f} = S\,R^{-\frac{1}{2}}\underline{r}$$

where:
S = fault vector covariance matrix (m×m),
$S = I - R^{-\frac{1}{2}} H\,(H^T R^{-\frac{1}{2}} H/^{-1} H^T R^{-\frac{1}{2}}$,
$\underline{f}^T \underline{f}$ used for fault detection, and
$f_i^2 / s_{ii}$ used for fault isolation.

Certain error mechanisms within a DR system can lead to gross navigational errors, since they are not reflected in the predicted uncertainty levels of Kalman filters. Included in this class of error mechanisms are the "ferry problem" and problems induced, for example, by excessive tire skidding on the vehicle 12 or an initial excessive heading error. Operation of the GPS/DR system onboard a vehicle 12 ferry, or other moving platform, will cause excessive errors to develop, since the odometer will indicate that the system is stationary. Excessive skidding will similarly induce significant error, since the odometer will indicate that the vehicle 12 is not moving, when, in fact, it is moving. Modification of the basic Kalman equations can be made to improve the tolerance of nonlinear effects, as induced by large heading errors, but will not guarantee convergence for very large errors. The approach to be taken, as part of the present invention, is to reinitialize the GPS/DR solution to the GPS only solution when a sufficient number of measurement rejections have occurred, indicating that the GPS solution cannot be "spoofed," or be based upon reflected signals. Both the position, speed and heading are then reinitialized to GPS values, and the GPS/DR filter is restarted.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A terrestrial vehicle position and velocity estimation system, comprising:
   input interface means for accepting raw global position system (GPS) pseudo range (PR) and pseudo range rate (PRR) measurement data, GPS position estimate data, and GPS velocity estimate data from a GPS navigation receiver mounted to a terrestrial vehicle;
   first computational means for mathematically modeling an error effect on said raw measurement data, position estimate data, and velocity estimate data due to periods of selective availability (SA) wherein range errors are deliberately introduced into GPS satellite transmission data to reduce the position accuracy of unauthorized GPS users;
   second computational means for mathematically modeling a heading scale factor error effect on an accumulated heading error of a dead-reckoning turning rate sensor connected to said terrestrial vehicle;
   third computational means for mathematically modeling an odometer scale factor error effect of a dead-reckoning odometer sensor connected to said terrestrial vehicle;
   Kalman filter means connected to a respective output of each of the first through third computational means for blending data output from each of the first through third computational means and to produce and output an estimate of a heading error and the odometer scale factor error from at least one of said raw GPS PRR measurements and said GPS velocity estimate data; and
   computer means connected to the Kalman filter means for computing a position and a velocity of said terrestrial vehicle from data obtained from said dead-reckoning turning-rate sensor and said dead-reckoning odometer sensor as individually corrected and weighted in the Kalman filter means for respective scale factor errors by partial PR and PRR measurement data periodically obtained from said GPS navigation receiver.

2. The system of claim 1, further comprising:
   adaptive blending means for combining GPS position and velocity estimate data with information from said dead-reckoning sensors, wherein in said combining:
   GPS velocity estimate data is used in a first single-state speed filter to estimate said odometer scale factor error;
   said GPS velocity estimate data is used in a second single-state heading filter to remove a heading drift of said dead-reckoning turning rate sensor and errors caused by dead-reckoning turning rate sensor scale factor error, and said GPS position estimate data is used in one of a first two-state and a third and a fourth single-state filters connected such that their gains are coupled to said first single-state speed filter and said second single-state heading filter to correct an accumulated error of a dead-reckoned position;
   each of said first and second single-state speed and heading filters add an extension to the Kalman filter means for correlated measurement error modeling and for including odometer and turning-rate sensor scale factor errors as process noise.

3. The system of claim 2, further comprising:
   means connected to the Kalman filter means and for adapting said heading filter to a turning sensor anomalous behavior and including a dead-reckoning turning rate sensor heading drift monitor for operating on an output of a calibration filter to adjust a process noise model of said heading filter.

4. The system of claim 2, further comprising:
   calibration means connected to the Kalman filter means and for calibrating the scale factor error associated with said turning rate sensor, including a digital filter for outputs of said heading filter for refining a set of initial estimates of sensor scale factors and separate clockwise and counterclockwise rotation filters.

5. The system of claim 2, further comprising:
isolation means connected to the Kalman filter means for rejecting GPS position and velocity estimate when a statistical rejection test indicates a substantial GPS error.

6. The system of claim 1, further comprising:
adaptive blending means connected to the input interface means, said dead-reckoning turning rate sensor and said dead-reckoning odometer sensor for combining individual GPS PR and PRR measurements with information from said dead-reckoning turning rate and odometer sensors, wherein in said combining:
individual GPS PRR measurements are processed by a four-state speed-and-heading filter which estimates heading error, odometer scale factor error, terrain slope, and receiver clock frequency error;
individual GPS PR measurements are processed by a four-state position filter for estimating three components of position error and receiver clock phase error, wherein said position filter gain calculation coupled to said speed and heading filter; and
said four-state speed-and-heading filter and said four-state position-and-receiver-clock-phase error filter each further include a modified basic Kalman filter measurement noise model for representing the effects of correlated process and measurement errors;
said position and speed-and-heading four-state filters replace a full eight-state Kalman filter to yield a factor of four improved computational efficiency; and
said position and speed-and-heading four-state filters reduce dead reckoning error growth when less than three GPS satellites are in view.

7. The system of claim 6, further comprising:
means connected to the Kalman filter means and for adapting said speed and heading filter to a turning rate sensor anomalous behavior and including a dead-reckoning turning rate sensor heading drift monitor for operating on an output of a calibration filter to adjust a process noise model of said speed and heading filter.

8. The system of claim 6, further comprising:
calibration means connected to the Kalman filter means and for calibrating said turning rate sensor scale factor error, including a digital filter for outputs of said speed and heading filter for refining a set of initial estimates of sensor scale factors and separate clockwise and counterclockwise rotation filters.

9. The system of claim 6, further comprising:
isolation means connected to the Kalman filter means and for rejecting GPS PR and PRR when a statistical rejection test indicates substantial GPS error.

10. The system of claim 1, further comprising:
adaptive blending means connected to the Kalman filter means and for combining individual GPS PR and PRR measurements with information from said dead-reckoning sensors and including two coupled four-state filters, wherein in said combining:
position and receiver clock phase error changes are estimated using an over-determined weighted least squares (WLS) solution based on dead reckoning position changes and available PR measurements from said GPS receiver; and
heading error, odometer scale factor error, terrain slope, and receiver clock frequency error are estimated using an over-determined WLS solution based on a dead reckoning velocity and available PRR measurements from said GPS receiver.

11. The system of claim 10, further comprising:
means connected to the Kalman filter means and for adapting said WLS speed and heading filter to a turning rate sensor anomalous behavior and including a dead-reckoning turning rate sensor heading drift monitor for operating on an output of a calibration filter to adjust the process noise model of said WLS speed and heading filter.

12. The system of claim 10, further comprising:
calibration means connected to the Kalman filter means and for calibrating a scale factor error associated with said turning rate sensor, including a digital filter for said WLS speed and heading filter for refining a set of initial estimates of sensor scale factors and separate clockwise and counterclockwise rotation filters.

13. The system of claim 1, further comprising:
continuous calibration means connected to the Kalman filter means and for correcting a turning rate sensor heading drift based upon one of a stationary measurement or a low-angular rate measurement using one of a fixed gain or Kalman filter.

14. The system of claim 1, further comprising:
gross-error recovery means for a system reinitialization to a next available GPS position and velocity estimate when a residual test of a WLS filter indicates a failure in dead reckoning.

* * * * *